UNITED STATES PATENT OFFICE.

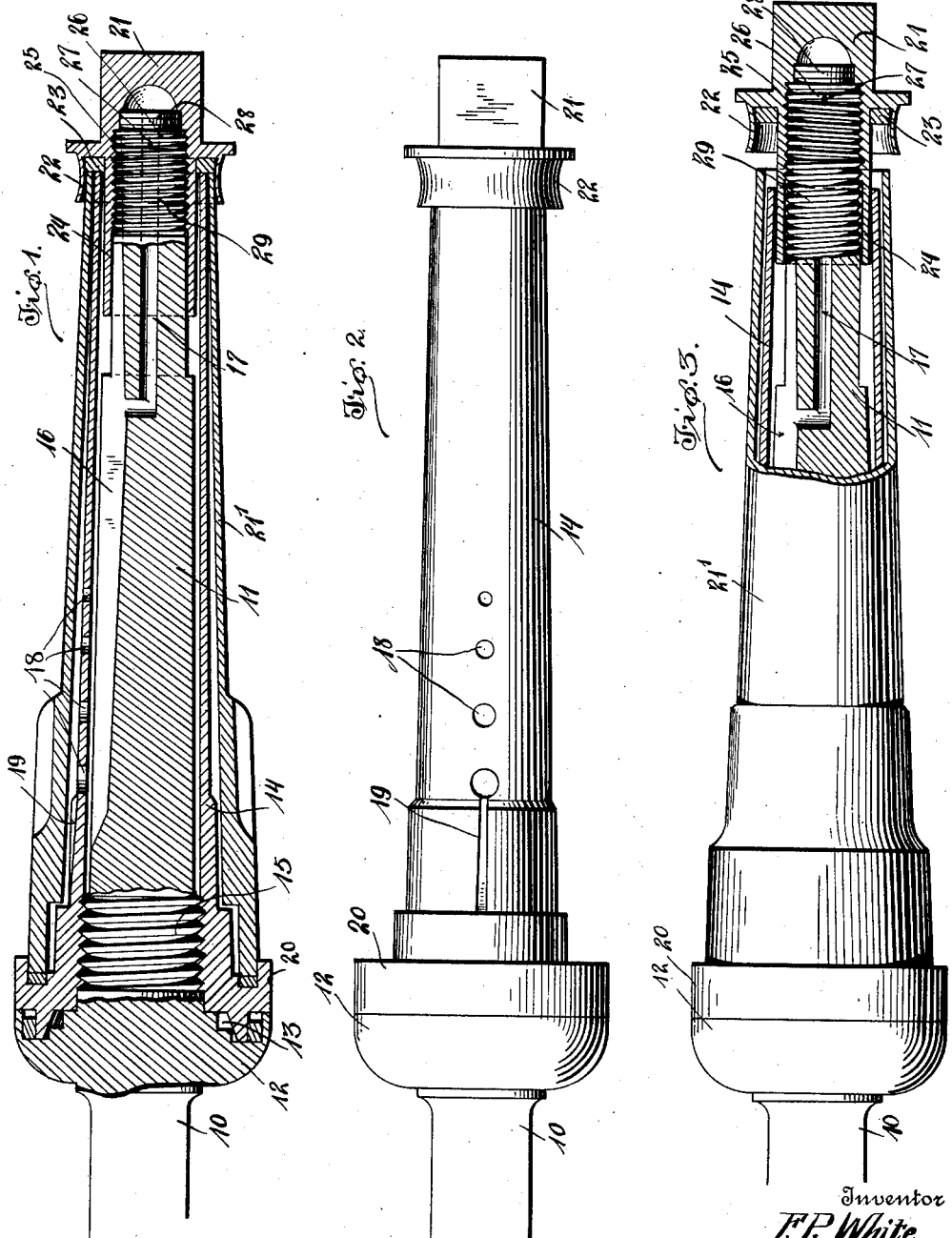

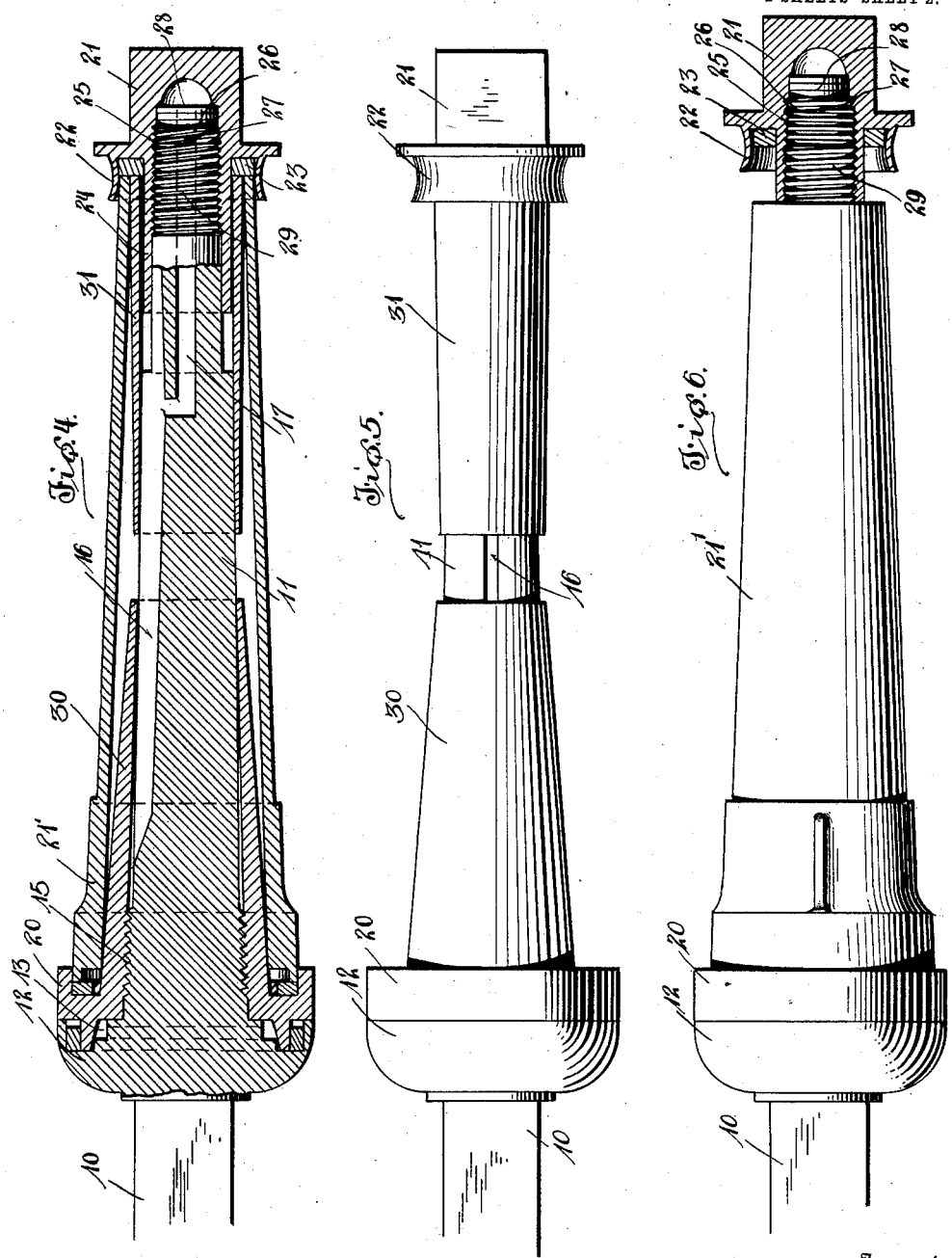

FRANKLIN P. WHITE, OF SHALLOTTE, NORTH CAROLINA.

AXLE-LUBRICATOR.

1,044,319.　　　　Specification of Letters Patent.　　Patented Nov. 12, 1912.

Application filed January 18, 1912. Serial No. 671,985.

*To all whom it may concern:*

Be it known that I, FRANKLIN P. WHITE, a citizen of the United States, residing at Shallotte, in the county of Brunswick, State of North Carolina, have invented certain new and useful Improvements in Axle-Lubricators; and I do hereby declare the following to be a full, clear, and exact description of the invention, such as will enable others skilled in the art to which it appertains to make and use the same.

My invention relates to new and useful improvements in vehicle axles and the object of my invention is to provide a simple and improved means for lubricating the bearing surfaces of the skein and box.

A further object of my invention is to provide means for lubricating the skein and box without the necessity of first removing the box. And a still further object of my invention is to provide a novel form of nut for securing the box in position upon the skein, said nut being formed with a sleeve adapted to be filled with lubricant and proportioned to engage above the spindle portion of the axle in such a manner that the tightening of the nut will serve to force the lubricant through a bore formed in the spindle and thence to the bearing surfaces of the skein and box.

With these and other objects in view, my invention will be more fully described, illustrated in the drawings which show a preferred embodiment of my device and then specifically pointed out in the claim which is attached to and forms a part of this application.

In the accompanying drawings, Figure 1 is a central longitudinal section of one form of my invention. Fig. 2 is a top plan view of the same, the wheel box being removed. Fig. 3 is a section similar to Fig. 1, showing the manner in which the lubricant is supplied to the wheel by applying the nut. Fig. 4 is a central longitudinal section of a modified form of my invention. Fig. 5 is a top plan view of the same, the wheel box being removed. Fig. 6 is a section similar to the section shown in Fig. 4, showing the application of the nut.

Referring more specifically to the drawings, in which similar reference numerals designate corresponding parts throughout, 10 designates the body portion of a vehicle axle and 11 the spindle at one end thereof, the spindle being provided at its base with an annular flange or cup 12 the outer face of which is provided with an annular groove 13 adapted to receive the inner end of a conventional form of skein 14 which skein, is provided with threads adapted to engage with the threaded portion 15 of the spindle whereby it is secured in place.

The spindle 11 is provided throughout a portion of its length with a longitudinally extending channel 16 and a bore 17 communicates between the outer end of the spindle and said channel. The skein 14 is provided with a plurality of alined ports 18 which communicate with this channel when the skein is in position, said ports graduating in size in proportion to the taper of the skein and the skein is further provided with a shallow groove 19 extending from the innermost of the ports to its wheel box engaging flange 20.

The wheel box 21' is positioned over the skein in the customary manner and is secured in place by means of a nut 21 which nut, has a radial flange 22 adapted to bear around the outer end of the skein and to bear against the outer end of the wheel box, a suitable washer 23 being interposed to form an air proof joint. The nut is provided with an integrally formed, inwardly extending sleeve 24 adapted, when the nut is in operative position, to extend between the spindle and skein as shown. The outer end of the socket formed by this sleeve is screw threaded as at 25 to receive an adjusting nut 26 which nut, is provided with a screw driver receiving slot 27 by means of which it may be readily adjusted. Interposed between the closed end of the socket and the nut are a plurality of washers 28. The threads 25 of the socket not only act to receive the nut 26 but are also cut to engage with the threads 29 of the outer end of the spindle and in operation the nut 21 is screwed home upon the spindle until the nut 26 bears firmly against the end thereof. By this means any wear between the flange 20 and the wheel box may be taken up by the removal of one or more of the washers 28.

In operation the skein and wheel box are positioned upon the spindle, the socket formed by the sleeve 24 of the nut 21 is filled with grease and the nut is applied to the end of the spindle and screwed home, the grease contained in the nut socket being thereby forced through the bore 17 into the channel 16 and thence through the ports 18 to the bearing faces of the skein and wheel box.

In Figs. 4, 5 and 6 of the drawings I have illustrated my improved lubricating nut applied to an axle fitted with a modified form of skein, all other parts of construction being identical. In these drawings the skein consists of an inner member 30 which tapers outwardly as shown and which terminates adjacent the central portion of the spindle and an outer member 31 which tapers inwardly and terminates with its inner end spaced from the outer end of the member 30. As shown, a wheel box of the Venturi tube type is employed and an annular grease receiving chamber is formed between the wheel box and the spindle and the opposed ends of the skein members. The operation with this modified form of oiling device is identical with the operation previously described for the form illustrated in Figs. 1, 2 and 3 with the exception that the grease instead of being immediately forced onto the bearing faces of the skein and axle box is forced into the annular chamber formed between the two which acts as a reservoir for the grease and from which the grease gradually feeds to the bearing faces as needed.

From the foregoing description it will be apparent that I have provided a simple and efficient form of axle lubricator in which the grease is placed within the nut and is forced to the bearing surfaces of the axle by the tightening of the nut.

It will of course be understood that minor changes in the details of construction may be made if desired without in the slightest degree departing from the spirit of my invention.

What I claim is:—

The combination with a spindle having an outer threaded end and a peripheral channel, the spindle also having a longitudinal bore communicating at one end with said channel and opening at its other end through the outer threaded end of the spindle, of a skein mounted on the spindle and having apertures for the passage of grease from the channel to the spindle, a wheel box bearing loosely about the skein and a nut provided with a centrally threaded socket adapted to engage with the threaded end of the spindle and a flange adapted to engage against the wheel box and hold the same against longitudinal movement on the skein, a second nut adjustable within the socket of the first nut whereby the first nut may be adjusted to take up wear between the wheel box and the skein, and a sleeve formed integral with the first nut and constituting a grease reservoir, said sleeve being adapted to pass between the skein and spindle as the nut is turned home, so that the grease from the sleeve will pass through the channel of the spindle and through the apertures in the skein.

In testimony whereof, I affix my signature, in presence of two witnesses.

FRANKLIN P. WHITE.

Witnesses:
OSCAR BENNETT,
A. N. WHITE.